United States Patent [19]

Peck et al.

[11] Patent Number: 5,177,133
[45] Date of Patent: Jan. 5, 1993

[54] HOT MELT ADHESIVE COMPOSITION

[75] Inventors: Michael C. Peck, Stone Mountain; Alan H. Deitch, Roswell; Susan L. Whitfield, Decatur, all of Ga.

[73] Assignee: Georgia-Pacific Resins, Inc., Atlanta, Ga.

[21] Appl. No.: 594,143

[22] Filed: Oct. 10, 1990

[51] Int. Cl.$^5$ .......................... C09F 1/04; C08L 93/04
[52] U.S. Cl. ..................................... 524/139; 524/270; 524/274; 530/213; 530/215; 530/218; 530/219
[58] Field of Search ............... 530/213, 215, 218, 219; 524/270, 274, 302, 291, 139

[56] References Cited

U.S. PATENT DOCUMENTS

| | | | |
|---|---|---|---|
| 3,285,855 | 11/1966 | Dexter et al. | 524/291 |
| 3,310,575 | 3/1967 | Spivack | 524/604 |
| 3,423,389 | 1/1969 | Wheelus | 530/219 |
| 3,780,013 | 12/1973 | Smith | 260/97.5 |
| 4,105,462 | 8/1978 | Thanos | 106/218 |
| 4,172,070 | 10/1979 | Scharrer et al. | 260/104 |
| 4,380,513 | 4/1983 | Ruckel et al. | 260/104 |
| 4,508,864 | 4/1985 | Lee | 524/187 |
| 4,536,445 | 4/1985 | Toy | 156/52 |
| 4,548,746 | 11/1985 | Duncan et al. | 260/104 |
| 4,643,848 | 2/1987 | Thomas et al. | 260/104 |
| 4,645,389 | 3/1987 | Graham et al. | 524/272 |
| 4,650,607 | 3/1987 | Lampo et al. | 260/104 |
| 4,659,514 | 4/1987 | Beuke | 260/104 |
| 4,712,808 | 12/1987 | Beh-Forrest et al. | 281/15 |
| 4,725,384 | 2/1988 | Du Vernet | 260/104 |
| 4,775,497 | 10/1988 | Pastor et al. | 260/103 |
| 4,788,009 | 11/1988 | Johnson | 530/218 |

FOREIGN PATENT DOCUMENTS

| | | |
|---|---|---|
| 197168 | 8/1983 | Czechoslovakia . |
| 2350030 | 4/1975 | Fed. Rep. of Germany . |
| 251885 | 12/1987 | German Democratic Rep. . |
| 44-13592 | 6/1969 | Japan . |
| 51-125138 | 1/1976 | Japan . |
| 62-104834 | 5/1987 | Japan . |
| WO8801281 | 2/1988 | PCT Int'l Appl. . |
| 1077911 | 3/1984 | U.S.S.R. . |
| 2065152 | 6/1981 | United Kingdom . |

OTHER PUBLICATIONS

*Radiat. Curing*, 9(3):29–30, 32–6 (1982).

Primary Examiner—Veronica P. Hoke
Attorney, Agent, or Firm—Banner, Birch, McKie & Beckett

[57] ABSTRACT

An improved, stable rosin ester tackifier consisting essentially of an adduct of rosin and a polyhydric alcohol selected from the group consisting of trimethylolpropane, trimethylolethane, and mixtures thereof, and hot melt adhesive compositions consisting essentially of said tackifier and a polymer component, said compositions containing a mixture of antioxidants containing a higher alkyl diester of thiopropionic acid, a hindered phenolic compound and a phenol sulfide compound, preferably an alkyl phenol disulfide oligomer.

23 Claims, No Drawings

HOT MELT ADHESIVE COMPOSITION

BACKGROUND OF THE INVENTION

1. Field of the Invention

This invention relates to an improved rosin ester composition consisting essentially of an adduct of rosin and either or both trimethylolpropane (TMP) and trimethylolethane (TME) and to an improved hot melt adhesive composition containing said rosin ester. The present invention is particularly directed to a thermally stable, rosin ester composition containing a particular combination of antioxidants and to hot melt adhesives containing said stable rosin ester.

2. Description of Related Art

Based upon their mode of application, adhesives typically can be divided into four generic categories: solution adhesives, dispersion adhesives, emulsion adhesives and hot melt adhesives. Recently, the popularity of hot melt adhesives has increased due to their ease of application to substrates and particularly to the lower amount of pollution associated with their use. Hot melt adhesives themselves can be divided into two classes, those that are tacky even at ambient temperature, e.g., at room temperature (i.e., about 20° to 25° C.), and those that are tack-free at ambient conditions. The former class of hot melt adhesives are commonly referred to as pressure-sensitive, hot melt adhesives, while the latter are simply referred to as hot melt adhesives. Except when it is otherwise obvious from the context, in the present application and claims the phrase "hot melt adhesive" will be used in the generic sense to describe both those compositions that are tacky at ambient conditions, especially at room temperature, and those that are tack-free.

Hot melt adhesives are generally thermoplastic materials which contain as essential constituents a thermoplastic polymer and a tackifier. Whether a particular hot melt adhesive composition is pressure sensitive or tack free at room temperature is determined in large part by the thermoplastic polymer present in the composition, by the tackifier component and the relative proportion of each. Tack-free hot melt adhesives also generally contain a wax.

Hot melt adhesives normally are homogeneous mixtures, and are manufactured by compounding, i.e., melt blending, the thermoplastic polymer with the tackifier and one or more waxes (in the case of tack-free compositions), antioxidants and/or other stabilizing additives. The molten mixture then is coated on a substrate, especially in the case of pressure sensitive hot melt adhesives or is cooled to form rods, pellets, bricks or the like for subsequent use. In the latter case, the hot melt adhesive is used by heating the tack-free solid adhesive until it becomes molten and the molten composition then is applied to the material for bonding by pumping or pressure extrusion through nozzles or slot dies. Such adhesives quickly melt upon heating and then set to a firm bond on cooling. Hot melt adhesives often may be held in the molten form prior to use at a temperature of between about 120° to 250° C. for up to 24 hours or more.

Since hot melt adhesives may be maintained for extended periods at elevated temperatures, a major concern has always been the thermal stability of the adhesive composition. Two properties of hot melt adhesives that commonly exhibit thermally-induced degradation from prolonged exposure are color and viscosity. Since both of these properties directly impact on the utility of such compositions in many applications, the art has continued to look for hot melt adhesives having improved thermal stability.

As used throughout the application and claims, thermal stability is a measurement of the oxidation resistance of a composition determined by holding 100 to 200 grams of a molten sample at 175° C. (350° F.) for a period of about 24 hours in the case of a tackifier composition, and about 96 hours for an adhesive composition, while monitoring changes in color and viscosity. Color is measured on the Gardner scale, which assigns a numerical value between 1 and 18 to quantify the color of the sample, preferably using a Gardner Delta Color comparator. A lower Gardner value indicates a lighter color and accordingly a lower degree of oxidative degradation. Viscosity changes are measured using a Brookfield thermocell viscometer. A qualitative assessment of thermal stability also is made by visually observing any surface skinning and/or charring of the molten sample.

Rosin esters, i.e., the reaction products of a rosin acid and a polyhydric alcohol, have been used widely as tackifiers for hot melt adhesives and more generally as modifiers for rubbers. When used as a tackifier in ethylene vinyl acetate (EVA) based hot melt adhesives, such tackifiers are claimed to produce hot melts of improved clarity and viscosity stability. The preferred tackifiers for hot melt adhesives have been the glycerol and pentaerythritol esters of rosin. Numerous patents have issued directed to methods for preparing such esters, and adhesive compositions containing them, having improved thermal stability. In this regard, please refer to U.S. Pat. Nos. 3,485,783; 3,780,013, 3,869,416; 4,172,070; 4,248,770; 4,283,317; 4,302,371; 4,380,513; 4,548,746; 4,643,848; 4,650,607; 4,659,514; 4,725,384; and 4,775,497. U.S. Pat. No. 4,725,384, for example, describes two commercial EVA-based hot melt adhesive formulations, one of low polarity and one of high polarity. Both formulations include a tall oil rosin-pentaerythritol ester as the tackifier. Nonetheless, problems of poor oxygen stability and color formation continue to confront hot melt adhesive compositions containing rosin ester tackifiers.

The present invention is based on the discovery that rosin ester tackifiers comprising the adduct of rosin and a polyhydric alcohol selected from the group consisting of trimethylolpropane (TMP), trimethylolethane (TME), and their mixtures and adhesive compositions containing such rosin esters exhibit enhanced thermal stability, i.e. an improved oxidation resistance, relative to similarly prepared rosin esters and similarly compounded adhesives containing such rosin ester tackifiers based on the more commonly used polyhydric alcohols such as glycerine (glycerol) and pentraerythritol.

DESCRIPTION OF THE INVENTION

The subject invention relates to an improved rosin ester tackifier composition consisting essentially of an adduct of rosin and a polyhydric alcohol selected from the group consisting of trimethylolpropane, trimethylolethane, and mixtures thereof, and optionally containing a mixture of antioxidants containing as essential ingredients a higher alkyl diester of thiodipropionic acid, a hindered phenolic compound and a phenol sulfide compound, preferably an alkyl phenol disulfide oligomer, wherein said adduct is made by reacting said rosin and said polyhydric alcohol in the presence of a phosphorous catalyst, and preferably in the presence of the phenol sulfide antioxidant. The invention further relates to an adhesive composition consisting essentially of a polymer component and said rosin ester tackifier.

While the prior art has generally described the preparation of rosin esters from a variety of polyhydric alcohols, including trimethylolpropane (TMP) and trimethylolethane (TME), and also has described using a variety of antioxidants, including those mentioned above, in preparing stabilized tackifier and hot melt adhesive compositions, the prior art has not specifically disclosed preparing such esters using a phosphorous catalyst, particularly in combination with a phenol sulfide compound, and has not specifically described applicants' particular combination of such antioxidants with a rosin ester tackifier based on either or both TMP and TME. Applicants have surprisingly determined that such rosin esters, and particularly those containing the noted combination of antioxidants, as well as hot melt adhesive compositions containing such rosin esters, exhibit improved thermal stability, as regards color stability and viscosity stability in particular, especially with respect to the most commonly used rosin esters based on glycerol. Applicants have found that such TMP and TME rosin esters are light-colored and exhibit excellent heat resistance, particularly when prepared in the presence of and/or formulated with a particular combination of stabilizer compounds (antioxidants). Consequently, the stabilized rosin esters of the present invention are particularly suitable as tackifiers for hot melt adhesives, both pressure sensitive adhesives and those that are tack-free at room temperature.

The present invention is not limited to any particular rosin for preparing the stabilized rosin ester, although tall oil rosin is preferred, especially distilled tall oil rosin containing less than about 5 weight percent tall oil fatty acids. Rosin is mainly a mixture of $C_{20}$, fused-ring, monocarboxylic acids, typified by pimaric and abietic acids, and is subceptible to numerous chemical transformations. Examples of suitable rosins used as starting materials in the present invention are gum rosin, wood rosin, and tall oil rosin as well as the rosin acids contained therein such as abietic acid, pimaric acid, sapinic acid and the like. The preparation of these rosins from various natural sources is well known and need not be described. A suitable rosin is available commercially from Georgia-Pacific Corporation under the designation GP Lytor 100. Other rosins, including modified rosins also are available, inter alia, from Hercules, Inc. under the Staybelite and Pexalyn labels.

Prior to, and in some cases subsequent to, preparing an ester of the present invention, the rosin may also be subjected to other treatments such as disproportionation, hydrogenation, mild polymerization, formaldehyde modification, modification with unsaturated mono-acids or diacids such as acrylic acid, fumaric acid and maleic anhydride and the like, or to some combination of these treatments. Such treatments can be used, for example, to modify the melt point of the resulting rosin ester of the present invention, which in the absence of such modification normally is similar to the melt point of rosin-glycerol esters.

The rosin ester tackifiers of the present invention preferably are prepared by reacting rosin and either or both trimethylolpropane and trimethylolethane under known rosin esterification conditions. Generally, the rosin is reacted with either or both trimethylolpropane and trimethylolethane in the presence of a catalyst. Preferably a phosphorus catalyst is used such as phosphinic acid (see e.g., U.S. Pat. Nos. 4,548,746 4,643,848; 4,650,607; and 4,725,384) or more preferably calcium bis[monoethyl(3,5-di-t-butyl-4-hydroxybenzyl)phosponate], available from Ciba-Geigy under the designation IRGANOX 1425, (see e.g., U.S. Pat. Nos. 4,659,514 and 4,775,497). The catalyst normally is added in an amount between about 0.01 and 1.25 part by weight, and preferably between about 0.2 and 0.375 part per 100 parts of the rosin added to the esterification reactor.

Normally, the rosin is melted in a reactor under an inert atmosphere, typically nitrogen, at a temperature of about 180°–200° C. Since the rosin ester desirably has a light color and the color is sensitive to oxygen exposure, the reaction is conducted under an inert atmosphere to minimize such oxygen exposure. The esterification catalyst and the TMP and/or TME then are added and the rosin and polyhydric alcohol are allowed to react at a temperature of about 250° to 280° C., more preferably between 272°–277° C. The TMP and/or TME is added to the esterification reactor in an amount of about 13 to 17 parts per 100 parts of rosin. The reaction is allowed to continue until the acid value, determined by potentiometric titration (ASTM D-465(1982)), decreases to below about 25, preferably to below about 15 and most preferably to about 10. In the latter stage of the reaction, it is preferred to purge the reactor with additional inert gas. Typically, the reaction is carried out over a period of about 3 to 10 hours.

It is particularly preferred to conduct the rosin esterification reaction in the presence of one of the components of the antioxidant mixture, and in particular in the presence of a phenol sulfide compound, such as one having the formula:

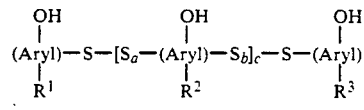

where the Aryl group can be phenyl or naphthyl; where $R^1$, $R^2$ and $R^3$ can be the same or different and are hydrocarbon groups, such as alkyl, cycloalkyl and substituted alkyl wherein the substituents may be cycloalkyl, aryl and alkaryl; where a and b are separately 0, 1, or 2, and where c is an interger between 0 and 20, preferably between 0 and 10. Preferably, the hydrocarbon groups contain between 1 and 22 carbon atoms and preferably are all the same. A particularly suitable phenol sulfide compound is available from Ethyl Corporation under the designation ETHANOX 323 and is identified as a nonylphenol disulfide oligomer. Other phenol sulfide compounds are described in U.S. Pat. No. 3,780,013 which is incorporated herein by reference. Such phenol sulfide compounds comprise one of the essential constituents of the antioxidant mixture required in the hot melt adhesive compositions of the present invention.

At the end of the esterification reaction period, the rosin ester adduct is cooled and the remaining components of the antioxidant mixture, discussed in more detail hereafter, are added to the partially cooled, molten mixture to form a stabilized rosin ester composition according to the present invention. The rosin esters most desirable are those exhibiting an acid value between about 5 and 15, a Ring & Ball Softening Point of between about 80° and 90° C. and a Gardner color (molten solid) of less than about 5.

An important ingredient in the rosin ester composition of the present invention, and in hot melt adhesives of the present invention, is a mixture of antioxidants including as necessary components a higher alkyl diester of thiopropionic acid, a hindered phenolic compound and a phenol sulfide compound, preferably an alkyl phenol disulfide oligomer. Antioxidants commonly are added to hot melt adhesive compositions to retard the continuing proclivity of such compositions to form hydroperoxides or peroxides during processing and storage. In the present invention, applicants have unexpectedly observed that there is a synergy between the TMP and/or TME rosin esters and the particular combination of antioxidants used in the present invention that contributes to enhanced thermal stability.

As discussed above, all of these ingredients preferably are added to the hot melt composition as components of the rosin ester trackifier, and most preferably, the phenol sulfide compound is actually included therein during preparation (esterification reaction) of the rosin ester tackifier. As suitable hindered phenolic compounds can be mentioned octadecyl-3-(3,5-di-t-butyl-4-hydroxyphenyl, 2,2'-ethylidine-bis(4,6-di-t-butyl) phenol, available from Schenectady Chemicals under the designation ISONOX 129, 4,4-methylenebis(2,6-di-t-butyl-phenol), 2,4,6-tris(3,5-di-t-butyl-4-hydroxybenzyl)-1,3,5-trimethylbenzene, [methylene-3-(3,5-di-t-butyl-4-hydroxyphenyl) propionate] methane, available from CibaGeigy under the designation Irganox 1010, and 2,4-bis(n-octylthio)-6-(4-hydroxy-3,5-di-t-butylanilino)-1,3,5-triazine, available from Ciba-Geigy as Irganox 565. Suitable higher alkyl diesters of thiopropionic acid include the $C_6$ to $C_{24}$ alkyl diesters of thiopropionic acid. Particularly suitable are distearyl thiodipropionate, dimyristyl thiodipropionate, and dilauryl thiodipropionate.

Each of these antioxidants constitutes between about 0.01 to 1.0 weight percent of the stabilized rosin ester tackifier. As a rule of thumb, each of these antioxidants can be added to the rosin ester tackifier in an amount between about 0.01 and 1.25 part by weight per 100 parts of rosin used in preparing the rosin ester. It is preferably to use a balanced mixture of these antioxidants in the composition. Consequently, the weight ration of the hindered phenolic to the phenol sulfide compound should be between about 0.5 to 2.0, preferably between about 0.75 and 1.25, while the weight ratio of the hindered phenolic compound to the higher alkyl diester of thiopropionic acid should be between about 0.25 and 1.5, preferably between about 0.4 and 1.0. Preferably, the hindered phenolic compound is included in the composition in an amount to constitute between about 0.1 to 0.5 percent by weight of the stabilized rosin ester, the phenol sulfide compound is included in the composition in an amount between about 0.15 to 0.4 percent by weight of the stabilized rosin ester, and the higher alkyl diester of thiopropionic acid is included in an amount to constitute between about 0.2 to 0.5 percent by weight of the stabilized rosin ester.

Depending on the desired properties of the resulting adhesive composition, a wide variety of polymer components can be used in formulating hot melt adhesives of the present invention by blending with the stabilized rosin ester tackifier. For example, adhesive compositions can be prepared by blending the TMP and/or TME rosin ester tackifiers with non-polar elastomers such as natural rubber, butyl rubber, NATSYN ® and synthetic rubbers based on polymers, including block copolymers, of butadiene, isoprene and styrene-butadiene (SBR), and the like, the latter being available from Shell Chemical Co. under the Kraton mark and from Phillips Chemical Co. under the Solprene mark; with polar rubbers such as nitrile rubber, chloroprene rubber, acrylic elastomers, epichlorohydrin elastomers and the like, and with ethylenic copolymers such as ethylene-vinyl acetate copolymers, copolymers of ethylene and acrylates such as methyl acrylate, ethyl acrylate and the like.

In the broadest aspects of the present invention, the polymer component and the rosin ester tackifier can be present in a hot melt composition in any relative proportion, though many compositions of this nature will not exhibit any significant property difference in comparison to either the polymer component or the rosin ester tackifier alone. Preferably, each component is present in a hot melt composition in at least some minimum amount. In this regard, compositions of the present invention generally will contain from about 50 to 300 parts by weight of the stabilized rosin ester per 100 parts of the polymer component, and more preferably from about 100 to 250 parts by weight of the stabilized rosin ester per 100 parts of the polymer component.

Wax is an especially useful and necessary additive for tackfree hot melt adhesive compositions. Suitable waxes include mineral waxes such as paraffin wax and microcrystalline wax, and synthetic waxes such as polyethylene wax and polypropylene wax, or Fisher-Tropshch waxes, particularly those having melting points between about 55° and 110° C. Other animal or vegetable waxes, such as carnauba wax, also may be employed. When used in an amount between about 20 to 200 parts by weight per 100 parts by weight of the polymer component used in the adhesive composition, waxes impart fluidity to the molten adhesive composition and flexibility to the set adhesive. Normally, a wax will be included in such compositions in an amount of between about 40 to 100 parts per 100 parts of the polymer component. Waxes also tend to improve the wetting action of the composition when bonding cellulosic materials.

As recognized by those skilled in the art, by varying the relative proportion of the various ingredients, including the polymer component, the rosin ester tackifier, and in those compositions where employed, the wax, a hot melt composition having a wide variation in many properties including tackiness, cohesive strength, rigidity, flexibility, deformation characteristics, and melt viscosity can be obtained.

The hot melt adhesive compositions of the present invention also may contain additional ingredients in minor amounts such as additional tackifiers other than the TMP and TME rosin esters; plasticizers such as chlorinated paraffins, esters such as dioctyl phthalate and dibutyl phthalate, polymeric esters and low molecular weight polymers and elastomers; fillers such as zinc oxide, carbon black and titanium oxide; extender oils or softeners; flame retardants and processing aids. Suitable extender oils, which tend to improve the flexibility and fluidity of the composition, include petroleum fractions of high boiling point such as mineral oil, for example paraffinic process oil, naphthenic process oil, aromatic process oil, liquid paraffin, white oil and petrolatum as well as vegetable oils such as castor oil, cotton seed oil, linseed oil, and rape seed oil.

The adhesive compositions of the present invention can be formed and processed using conventional equipment. The adhesive components can be blended in a mixer such as a two roll mill, a Sigma mixer, a twin screw extruder and the like. The adhesive formulation can be shaped into any desired configuration, such as a tape or sheet by extrusion, compression molding, calendaring, or the like. The adhesive can be laminated to one of the substrates to be bonded.

The hot melt adhesive composition of the present invention may be applied to a suitable substrate from a molten mass using conventional hot melt adhesive applicators. When employed as an adhesive, the hot melt composition of the present invention is applied on one of the surfaces to be mated in an amount of about 5 to 50 grams per square meter. Examples of suitable substrates are plastic sheets or films, textile fabrics of man made or natural fibers, nonwovens, paper, wood, glass, metal, and rubber. As representative plastics can be mentioned polyolefins such as polyethylene or polypropylene, polyvinyl chloride, polyethylene glycol terephthalate and polystyrene. The composition of the present invention is broadly applicable for replacing known hot melt adhesives in any application where such adhesives have heretofore been used, and is particularly suitable for those applications where high temperature stability is most desired.

The following examples are set forth to illustrate preferred embodiments of the present invention and are not to be considered as limiting the scope of the invention.

EXAMPLE 1

Preparation of TMP Rosin Ester Tackifier (236D36)

To a three liter, five-neck flask was charged about 85 parts by weight of GP Lytor 100 brand tall oil rosin. A nitrogen blanket was applied and the rosin was melted over about a one hour period. The flask was then fitted with a stirring rod and paddle, a take-off tube and a thermometer. While agitating the molten contents of the flask, about 0.26 part of Irganox 1425, a phosphite catalyst available from Ciba-Geigy, and about 0.17 part of Ethanox 323, an alkyl phenol disulfide oligomer available from Ethyl Corporation, were added. The temperature was adjusted to about 190° C. and about 12.8 parts by weight of trimethylolpropane (TMP) were added. The temperature was initially held at 190° C. for ½ hour and then was raised to within the range of about 250°–280° C., more specifically to between about 272°–277° C. The reaction was allowed to progress, with water of condensation being collected through the take off tube, while the acid value of the reactant mixture was monitored. A small addition of TMP (about 0.8 part) was made when the acid value had dropped to about 30. When the acid value had dropped to about 20, a vigorous nitrogen sweep was initiated and maintained until the acid value dropped to below 12. At that point, the reaction mixture was cooled to about 250° C. and about 0.5 part distearyl thiodipropionate (DSTDP) available from Morton Thiokol and about 0.21 part Irganox 565, a hindered phenolic stabilizer (antioxidant) available from Ciba-Geigy were added to the reaction mixture. The resulting rosin ester had a molten Gardner color of 4-, an acid value of 11.1, and a ring and ball softening point of 85° C.

EXAMPLE 2

Preparation of Hot Melt Adhesive (237D45)

A hot melt adhesive using the material of Example 1 was prepared by melt blending 53 parts of the ester of Example 1, 27 parts of ELVAX 220, an ethylene vinyl acetate copolymer available from DuPont, and 20 parts of Shellwax 300, a paraffin wax available from Shell Chemical Co. These ingredients were mixed in a glass jar at 350° F. (177° C.) until completely molten. To assess thermal stability, the molten mixture was placed in a forced air oven to maintain a temperature of 350° F. for 96 hours. Under these conditions, the hot melt adhesive of the present invention changed from a Gardner color of 2- to a Gardner color of 6-.

EXAMPLE 3

Preparation of TME Rosin Ester Tackifier (236D90)

To a three liter, five-neck flask, fitted with a stirring rod and paddle, a take-off tube and a thermometer, was charged about 87.5 parts by weight of GP Lytor 100 brand tall oil rosin. A nitrogen blanket was applied and the rosin was melted. While agitating the molten contents of the flask, about 0.20 part of Irganox 1425, a phosphite catalyst available from Ciba-Geigy, and about 0.17 part of Ethanox 323, an alkyl phenol disulfide oligomer available from Ethyl Corporation, were added. The temperature was adjusted to about 200° C. and about 11.5 parts by weight of trimethylolethane (TME) was added. The temperature was then raised to within the range of about 250°–280° C., more specifically to between about 272°–277° C. The reaction was allowed to progress, with water of condensation being collected through the take off tube, while the acid value of the reactant mixture was monitored. When the acid value had dropped to about 20-25, a vigorous nitrogen sweep was initiated and maintained until the acid value dropped to below 12. At that point, the reaction mixture was cooled to about 250° C. and about 0.5 part distearyl thiodipropionate (DSTDP) available from Morton Thiokol and about 0.21 part Irganox 565, a hindered phenolic stabilizer (antioxidant) available from Ciba-Geigy were added to the reaction mixture. The resulting rosin ester had a molten Gardner color of 4+, an acid value of 11.8, and a ring and ball softening point of 82.5° C. The ester underwent a color change to a Gardner 5+ after a 24 hour stability test.

EXAMPLE 4

Preparation of Hot Melt Adhesive

A hot melt adhesive can be prepared using the material of Example 3 by melt blending 53 parts of the ester of Example 3, 27 parts of ELVAX 220, an ethylene vinyl acetate copolymer available from DuPont, and 20 parts of Shellwax 300, a paraffin wax available from Shell Chemical Co., at 325° F. (163° C.) until completely molten.

COMPARATIVE EXAMPLE 1

Preparation of Comparative Glycerol Rosin Ester Tackifier (236D35)

To a three liter, five-neck flask, fitted with a stirring rod and paddle, a take-off tube and a thermometer, was charged about 86.7 parts by weight of GP Lytor 100 brand tall oil rosin. A nitrogen blanket was applied and the rosin was melted. While agitating the molten contents of the flask, the temperature was adjusted to about 190° C. and about 0.17 part of Ethanox 323, an alkyl phenol disulfide oligomer available from Ethyl Corporation, and about 9.4 parts by weight of glycerin (glycerol) were added. The temperature was first held for ½ hour at 190° C. and then was raised to within the range of about 250°–280° C., more specifically to between about 267°–277° C. The reaction was allowed to progress, with water of condensation being collected through the take off tube, while the acid value of the reactant mixture was monitored. When the acid value had dropped to about 20, a small addition of glycerine (about 0.6 part) was made and a vigourous nitrogen sweep was initiated and maintained until the acid value dropped to about 12. At that point, the reaction mixture was cooled to about 250° C. and about 0.5 part distearyl thiodipropionate (DSTDP) available from Morton Thiokol and about 0.22 part Irganox 565, a hindered phenolic stabilizer (antioxidant) available from Ciba-Geigy were added to the reaction mixture. The resulting rosin ester had a molten Gardner color of 5-, an acid value of 11.7, and a ring and ball softening point of 89° C.

COMPARATIVE EXAMPLE 2

Preparation of Comparative Hot Melt Adhesive (237D45)

A hot melt adhesive using the material of Comparative Example 1 was prepared by melt blending 53 parts of the ester of Comparative Example 1, 27 parts of ELVAX 220, an ethylene vinyl acetate copolymer available from DuPont, and 20 parts of Shellwax 300, a paraffin wax available from Shell Chemical Co. These ingredients were mixed in a glass jar at 350° F. (177° C.) until completely molten. To assess thermal stability, the molten mixture was placed in a forced air oven to maintain a temperature of 350° F. for 96 hours. Under these conditions, the hot melt adhesive changed from a Gardner color of 2+ to a Gardner color of 9+.

EXAMPLE 5

Preparation of TMP-Modified Rosin Tackifier (278D52)

A three liter, five-neck flask, fitted with a stirring rod and paddle, a take-off tube and a thermometer, was charged with about 83.3 parts by weight of GP Lytor 100 brand tall oil rosin. A nitrogen blanket was applied and the rosin was melted by heating it to 200° C. Fumaric acid, 2 parts, was added and reacted for 15 minutes. About 0.2 part of Irganox 1425, a phosphite catalyst available from Ciba-Geigy, about 0.17 part of Ethanox 323, an alkyl phenol disulfide oligomer available from Ethyl Corporation, and about 9.4 parts by weight of trimethylolpropane (TMP) were added to the fumaric acid-modified rosin melt. The temperature was first held for ½ hour at 200° C. and then was raised to within the range of about 250°–280° C., more specifically to between about 270°–277° C. The reaction was allowed to progress, with water of condensation being collected through the take off tube, while the acid value of the reactant mixture was monitored. When the acid value had dropped to about 20, a vigorous nitrogen sweep was initiated and maintained until the acid value dropped to about 9. At that point, the reaction mixture was cooled to about 240° C. and about 0.4 part distearyl thiodipropionate (DSTDP) available from Morton Thiokol and about 0.15 part Irganox 565, a hindered phenolic stabilizer (antioxidant) available from Ciba-Geigy were added to the reaction mixture. The resulting rosin ester had a molten Gardner color of 5-, an acid value of 8.5, and a ring and ball softening point of 97° C.

EXAMPLE 6

Preparation of Hot Melt Adhesive (237D76)

A hot melt adhesive using the tackifier material of Example 5 was prepared by melt blending 53 parts of the Example 5 ester, 27 parts ELVAX 220, and 20 parts Shellwax 300. The thermal stability of the so-prepared hot melt adhesive was evidenced by a color change from an initial value of a Gardner 4- to a value of 6+, and a viscosity change from an initial value of 638 cps to a final value of 645 cps.

A similar hot melt adhesive formulated with the lower softening point resin of Example 1 experienced a Gardner color change from 4 to 6+ and a viscosity change from 570 cps to 580 cps. For comparison, a similar hot melt adhesive composition was prepared using 53 parts of Permalyn 603, an ultralight pentaerythritol ester available from Hercules, in place of the stabilized rosin esters of the present invention. Permalyn 603 is believed to be a wood rosin ester, rather than a tall oil rosin ester. The thermal stability of the hot melt adhesive formulated with the Permalyn 603 was indicated by a color change of 1+ to 7 and a viscosity change of 663 cps to 850 cps, a viscosity change of about 28%.

While certain specific embodiments of the present invention have been described with particularity herein, it will be recognized that various modifications thereof will occur to those skilled in the art and it is to be understood that such modifications and variations are to be included within the purview of this application and the spirit and scope of the appended claims.

We claim:

1. A stabilized rosin ester consisting essentially of an adduct of rosin and a polyhydric alcohol selected from the group consisting of trimethylolpropane, trimethylolethane, and mixtures thereof, wherein said adduct is prepared by reacting said rosin and said polyhydric alcohol in the presence of a catalytic amount of calcium bis[monoethyl(3,5-di-t-butyl-4-hydroxy-benzyl) phosphonate as a phosphorus catalyst and a stabilizing amount of a phenol sulfide compound.

2. The rosin ester of claim 1 wherein said phenol sulfide compound is an alkyl phenol disulfide oligomer.

3. The rosin ester of claim 1 wherein said phenol sulfide compound has the formula:

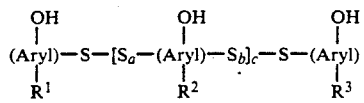

where the aryl group can be phenyl or naphthyl; where $R^1$, $R^2$ and $R^3$ can be the same or different and are hydrocarbon groups, where a and b are separately 0, 1, or 2, and where c is an interger between 0 and 20.

4. A stabilized rosin ester consisting essentially of an adduct of rosin and a polyhydric alcohol selected from the group consisting of trimethylolpropane, trimethylolethane, and mixtures thereof, and a stabilizing amount of a mixture of antioxidants containing as essential ingredients a higher alkyl diester of thiopropionic acid, a hindered phenolic compound and a phenol sulfide compound.

5. The rosin ester of claim 4 wherein said higher alkyl diester of thiopropionic acid is selected from the group consisting of distearyl thiodipropionate, dimyristyl thiodipropionate, and dilauryl thiodipropionate.

6. The rosin ester of claim 4 wherein said adduct is prepared in the presence of a catalytic amount of a phosphorus catalyst and a stabilizing amount of a phenol sulfide compound.

7. The rosin ester of claim 6 wherein said phosphorus catalyst is calcium bis[monoethyl(3,5-di-t-butyl-4-hydroxybenzyl)phosphonate].

8. The rosin ester of claim 7 wherein said phenol sulfide compound is an alkyl phenol disulfide oligomer.

9. The rosin ester of claim 7 wherein said phenol sulfide compound has the formula:

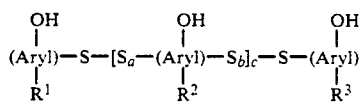

where the aryl group can be phenyl or naphthyl; where $R^1$, $R^2$ and $R^3$ can be the same or different and are hydrocarbon groups, where a and b are separately 0, 1, or 2, and where c is an interger between 0 and 20.

10. The rosin ester of claim 5 wherein said hindered phenolic compound is selected from the group consisting of octadecyl-3-(3,5-di-t-butyl-4-hydroxyphenyl, 2,2'-ethylidine-bis(4,6-di-t-butyl) phenol, 4,4-methylene-bis(2,6-di-t-butyl-phenol), 2,4,6-tris(3,5-di-t-butyl-4-hydroxybenzyl)-1,3,5-trimethylbenzene, [methylene-3-(3,5-di-t-butyl-4-hydroxyphenyl)propionate] methane, and 2,4-bis(n-octylthio)-6(4-hydroxy-3,5-di-t-butylanilino)-1,3,5-triazine.

11. The rosin ester of claim 10 wherein said phenol sulfide compound has the formula:

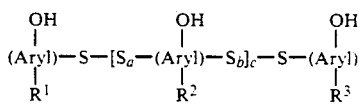

where the aryl group can be phenyl or naphthyl; where $R^1$, $R^2$ and $R^3$ can be the same or different and are hydrocarbon groups, where a and b are separately 0, 1, or 2, and where c is an interger between 0 and 20.

12. The rosin ester of claim 11 wherein said phenol sulfide compound is an alkyl phenol disulfide oligomer.

13. The rosin ester of claim 1 or claim 6 wherein said catalytic amount is 0.01 to 1.25 part by weight per 100 parts of said rosin and said stabilizing amount is 0.01 to 1.25 part by weight per 100 parts of said rosin.

14. A hot melt adhesive composition consisting essentially of a polymer component, a rosin ester tackifier consisting essentially of an adduct of rosin and a polyhydric alcohol selected from the group consisting of trimethylolpropane, trimethylolethane, and mixtures thereof, and a stabilizing amount of a mixture of antioxidants containing as essential ingredients a higher alkyl diester of thiopropionic acid, a hindered phenolic compound and a phenol sulfide compound.

15. The hot melt adhesive of claim 14 wherein said polymer component is selected from non-polar elastomers, polar elastomers and ethylenic copolymers.

16. The hot melt adhesive of claim 15 wherein said non-polar elastomer comprises styrene-butadiene rubber.

17. The hot melt adhesive of claim 15 wherein said ethylenic copolymer comprises an ethylene-vinyl acetate copolymer.

18. A hot melt adhesive composition consisting essentially of a polymer component, a rosin ester tackifier consisting essentially of an adduct of rosin and a polyhydric alcohol selected from the group consisting of trimethylolpropane, trimethylolethane, and mixtures thereof, a stabilizing amount of a mixture of antioxidants containing as essential ingredients a higher alkyl diester of thiopropionic acid, a hindered phenolic compound and a phenol sulfide compound and wax.

19. The hot melt adhesive of claim 14 or 18 wherein said adduct is prepared in the presence of a catalytic amount of a phosphorus catalyst and a stabilizing amount of a phenol sulfide compound.

20. The hot melt adhesive of claim 19 wherein said phosphorus catalyst is calcium bis[monoethyl(3,5-di-t-butyl-4-hydroxybenzyl)phosphonate].

21. The hot melt adhesive of claim 20 wherein said phenol sulfide compound is an alkyl phenol disulfide oligomer.

22. The hot melt adhesive of claim 19 wherein said hindered phenolic compound is selected from the group consisting of octadecyl-3-(3,5-di-t-butyl-4-hydroxyphenyl, 2,2'-ethylidine-bis(4,6-di-t-butyl) phenol, 4,4-methylene-bis(2,6-di-t-butyl-phenol), 2,4,6-tris(3,5-di-t-butyl-4-hydroxybenzyl)-1,3,5-trimethylbenzene, [methylene-3-(3,5-di-t-butyl-4-hydroxyphenyl) propionate] methane, and 2,4-bis(n-octylthio)-6(4-hydroxy-3,5-di-t-butylanilino)-1,3,5-triazine.

23. The hot melt adhesive of claim 19 wherein said catalytic amount is 0.01 to 1.25 part by weight per 100 parts of said rosin and said stabilizing amount is 0.01 to 1.25 part by weight per 100 parts of said rosin.

* * * * *